(12) United States Patent
Brogårdh

(10) Patent No.: US 7,756,608 B2
(45) Date of Patent: Jul. 13, 2010

(54) SYSTEM FOR CALIBRATION OF AN INDUSTRIAL ROBOT AND A METHOD THEREOF

(75) Inventor: Torgny Brogårdh, Västerås (SE)

(73) Assignee: ABB AB, Västerås (SE)

( * ) Notice: Subject to any disclaimer, the term of this patent is extended or adjusted under 35 U.S.C. 154(b) by 291 days.

(21) Appl. No.: 11/885,234

(22) PCT Filed: Feb. 21, 2006

(86) PCT No.: PCT/EP2006/060140

§ 371 (c)(1),
(2), (4) Date: Aug. 28, 2007

(87) PCT Pub. No.: WO2006/089887

PCT Pub. Date: Aug. 31, 2006

(65) Prior Publication Data

US 2008/0201015 A1 Aug. 21, 2008

Related U.S. Application Data

(60) Provisional application No. 60/656,543, filed on Feb. 28, 2005.

(51) Int. Cl.
*G05B 19/04* (2006.01)
(52) U.S. Cl. ..................................... 700/254
(58) Field of Classification Search ............... 700/245, 700/254, 258–259; 702/85, 91–95

See application file for complete search history.

(56) References Cited

U.S. PATENT DOCUMENTS

| 5,177,563 A | 1/1993 | Everett et al. |
| 6,366,831 B1 | 4/2002 | Raab |
| 6,587,802 B1 * | 7/2003 | Schroder et al. .............. 702/91 |

FOREIGN PATENT DOCUMENTS

| EP | 0533949 A1 | 3/1993 |
| WO | WO-2004/071717 A1 | 8/2004 |
| WO | WO-2004/076132 A2 | 9/2004 |

OTHER PUBLICATIONS

PCT/ISA/210—International Search Report—Nov. 27, 2006.
PCT/ISA/237—Written Opinion of the International Searching Authority—Nov. 27, 2006.

* cited by examiner

*Primary Examiner*—Kim T Nguyen
(74) *Attorney, Agent, or Firm*—Venable LLP; Eric J. Franklin

(57) ABSTRACT

A method for calibration of an industrial robot including a plurality of movable links and a plurality of actuators effecting movement of the links and thereby of the robot. The method includes mounting a measuring tip on or in the vicinity of the robot, moving the robot such that the measuring tip is in contact with a plurality of measuring points on the surface of at least one geometrical structure on or in the vicinity of the robot, reading and storing the positions of the actuators for each measuring point, and estimating a plurality of kinematic parameters for the robot based on a geometrical model of the geometrical structure, a kinematic model of the robot, and the stored positions of the actuators for the measuring points.

22 Claims, 7 Drawing Sheets

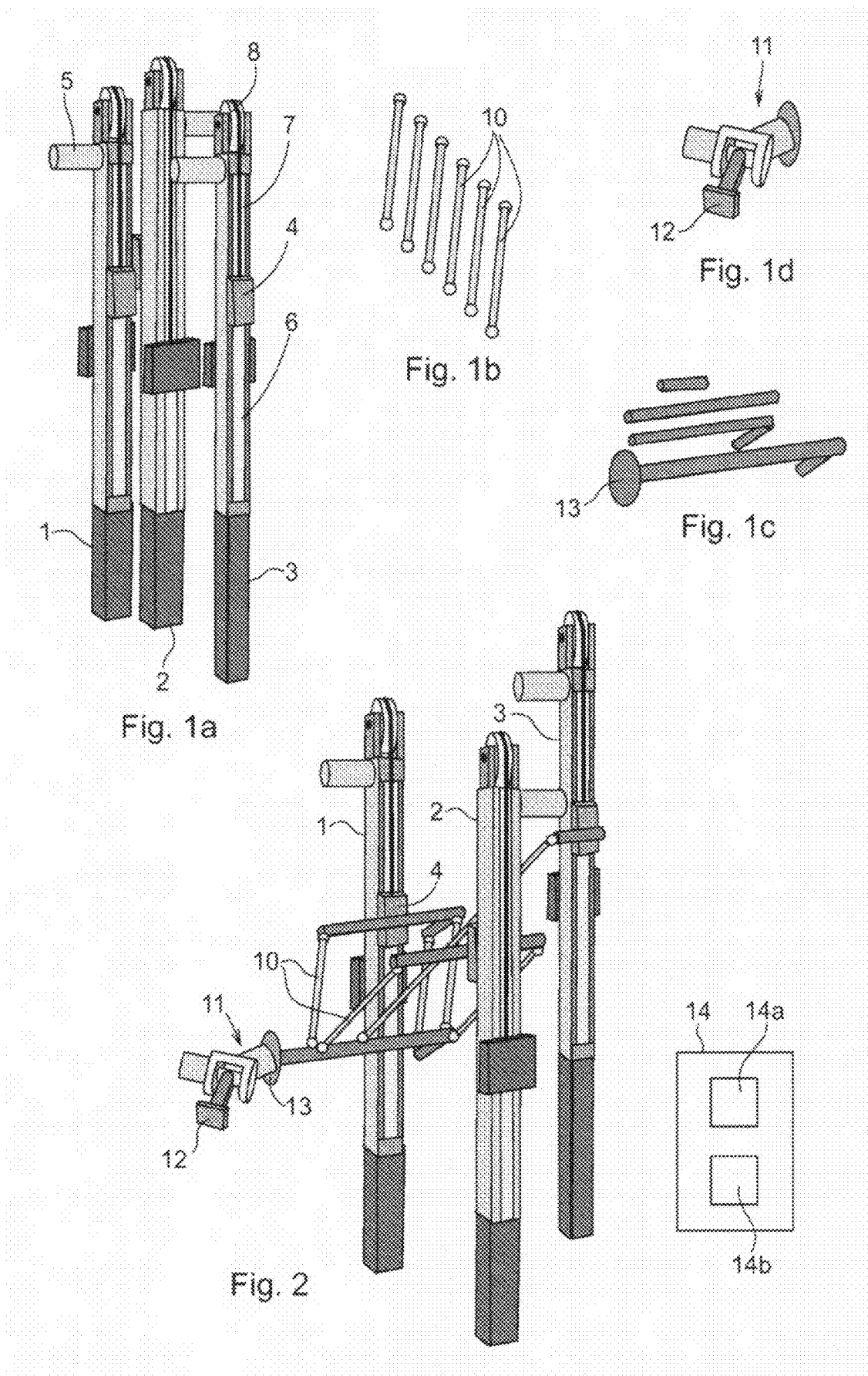

SYSTEM FOR CALIBRATION OF AN INDUSTRIAL ROBOT AND A METHOD THEREOF

CROSS-REFERENCE TO RELATED APPLICATIONS

This application claims priority to U.S. provisional patent application 60/656,543 filed 28 Feb. 2005 and is the national phase under 35 U.S.C. §371 of PCT/EP2006/060140 filed 21 Feb. 2006.

FIELD OF THE INVENTION

The present invention relates to a system and a method for calibration of an industrial robot including a plurality of movable links and a plurality of actuators effecting movement of the links and thereby of the robot. The method is suitable for calibration of any type of robot, such as a parallel kinematic robot or a serial kinematic robot.

PRIOR ART

An industrial robot includes a manipulator and a control unit having means for controlling the movements of the manipulator. There are different types of manipulators, such as a serial kinematic manipulator and a parallel kinematic manipulator. If the robot is a serial kinematic robot the links are also denoted arms. The manipulator includes a plurality of movable axes. The axes are either rotational or linear. For the possibility to determine the position of the robot, each axis is usually provided with an angle-measuring device in the form of an encoder or a resolver.

Today, most robots are assembled at the manufacturer. However, a new parallel kinematic robot concept makes highly modularized robots possible, which means that it will be very easy to assemble the robot components, such as actuators, links, mounting platforms and wrists. This opens up for the opportunity to deliver the components directly from the robot component manufacture to the automation system builders, or to the end customer, where the robots are assembled. When the robot has been assembled it must be calibrated before it can be put into operation. The calibration includes determining a plurality of kinematic parameters, such as the position and orientation of the actuators, link lengths, and mounting positions for the links. Thereafter, the robot sometimes needs to be re-calibrated, for example after moving the robot to another location or after major repairs, such as actuator or link changes.

For the robot calibration, expensive special measuring equipment, such as laser interferometer systems, is used and special robot programs are adopted with time-consuming definitions of points and movements. Thus, problems with prior art calibration methods are that they require educated people, are time-consuming and expensive. However, an end-user having few robots is not interested in investing in expensive measuring equipment. Thus, there is a need to find a cheap and simple calibration method suitable for calibration at site.

OBJECTS AND SUMMARY OF THE INVENTION

The object of the present invention is to provide robot calibration, which eliminates the need of expensive measuring equipment and which is easy and intuitive to use.

Such a method comprises: mounting a measuring tip on or in the vicinity of the robot, moving the robot such that the measuring tip is in contact with a plurality of measuring points on one or more surfaces of at least one geometrical structure on or in the vicinity of the robot, reading and storing the positions of the actuators for each measuring point, and estimating a plurality of kinematic parameters for the robot based on a geometrical model of the geometrical structure, a kinematic model of the robot, and the stored positions of the actuators for the measuring points. The number of surfaces depends on how many kinematic model parameters that need to be identified. The kinematic model should include the parameters to be identified. For example, the kinematic parameters include position and orientation of the actuators, and lengths and joint positions for the links. The measuring tip is either mounted on the robot, or fixedly in the robot workspace. The geometrical structure is either a part of the robot, or a specific calibration object mounted on the robot or somewhere in the robot workspace. The geometrical structure must have a known geometrical model, preferably a CAD-model that can describe any surface- and object shape in a generic way, for example by using surface splines.

The method is very easy to use and does no require any expert knowledge. The measurements on the geometrical structure are made simply by moving the measuring tip over the surface of the geometrical structure while the actuator positions are stored. Preferably, the measuring tip is moved with the robot in force manipulation mode. In the force manipulation mode the robot control unit reads force- and torque values from a force/torque sensor mounted between the tool (in this case the measuring tip or a reference object) and the tool flange. These values are used by the control unit to calculate the actuator movements needed for the robot to follow the movements that the operator wants the tool to have, with respect to the forces and torques that the operator gives to the tool. The actuator positions are measured with existing measuring devices, for example encoders or resolvers, of the robot. Thus, no expensive measuring equipment is needed. This method does only require a measuring tip and possibly a simple geometrical structure and accordingly is inexpensive.

According to an embodiment of the invention, the estimation of the kinematic parameters comprises: calculating the positions of the measuring tip based on the stored positions of the actuators and the kinematic model of the robot (describing the transformation from actuator position in joint coordinates to the tool tip position in Cartesian coordinates), and using a best fit method in order to find the kinematic parameters that achieve the best correspondence between the calculated positions of the measuring tip, using the kinematic model with the parameters to be identified, and corresponding positions on the geometrical model of the geometrical structure. The kinematic parameters are estimated by trying to find the values on the parameters that achieve the best correspondence between positions on the surfaces of the geometrical model and the calculated positions of the measuring tip. The best fit method could iteratively adjusts the kinematic parameters until matches are obtained between the calculated measuring tip positions and positions on the surface of the geometrical model. For example, the distances between the calculated measuring positions and their closest points on the surface of the geometrical model is minimized by a least mean square method.

According to an embodiment of the invention, the geometrical structure is a part of the robot. In this embodiment, the geometry of the robot itself is used. It is advantageous to use a part or parts of the robot structure as the geometrical structure, since there already exist CAD-models for the robot parts, which CAD-models were produced during manufacturing of the robot. Another advantage is that no extra geometrical structure is needed.

According to an embodiment of the invention, at least one of the actuators is mounted in an actuator support structure, and the geometrical structure is the actuator support structure and the geometrical model is a CAD-model of the actuator support structure. For example, if the robot is a parallel kinematic robot it is possible to use the geometry of the linear actuator modules. It has been proven that it is possible to determine at least some of the kinematic parameters with sufficient accuracy by using the actuator support structure of the robot, especially if the support structure has a high geometrical complexity.

According to an embodiment of the invention the robot comprises a wrist having a tool flange and the measuring tip is mounted on the tool flange of the wrist. Using a wrist, movable in one or more degrees of freedom, makes it possible to reach more measuring points on the surfaces of geometrical structures and thus to improve the determination of the kinematic parameters.

According to an embodiment of the invention, the method further comprises notifying the user if it is not possible to determine all kinematic parameters based on the stored positions. Then, the operator has to make measurements with the measuring tip over more surfaces in order have the robot calibrated. This embodiment is advantageous since it gives the operator a chance to provide the system with more measurements until it is possible to determine the kinematic parameters needed for the robot tasks with sufficient accuracy.

According to an embodiment of the invention the method further comprises: mounting a second geometrical structure on or in the vicinity of the robot, moving the robot such that the measuring tip is in contact with a plurality of measuring points on the surface of the second geometrical structure, reading and storing the positions of the actuators for each measuring point, and estimating at least some of the kinematic parameters based on a geometrical model of the second geometrical structure, the kinematic model of the robot, and the stored positions of the actuators for the measuring points on the second geometrical structure. The second geometrical structure should have a shape that is suitable for determining the kinematic parameters. For example, if the geometry of the robot itself is not enough to determine all kinematic parameters needed, this embodiment provides a possibility to use a second geometrical structure having a suitable, and thereby to determine all kinematic parameters needed.

According to an embodiment of the invention, at least one of the actuators is mounted in an actuator support structure, and the second geometrical structure is mounted on the actuator support structure. Then the mounting position and orientation on the actuator support structure is known from the CAD model of the actuator support structure and the position and orientation of the second geometrical structure will be known, which is important for the identification of global (not robot internal) kinematic parameters.

According to an embodiment of the invention, the robot comprises a plurality (usually three) of main axes and the estimated parameters are kinematic parameters for the main axes of the robot. The kinematic parameters for the main axes include positions and orientations of the actuator kinematics (the positions and orientations of actuator-paths if they are linear and the positions and orientations of their rotation axes if they are rotational) and lengths and joint positions for the links.

According to an embodiment of the invention, the links are controlling a movable platform, the geometrical structure is the movable platform, and the method further comprises: moving the robot such that the measuring tip is in contact with a plurality of measuring points on the platform, reading and storing the positions of the actuators for each measuring point, mounting a wrist having a tool flange to the movable platform, moving the robot such that the measuring tip is in contact with a plurality of measuring points on the tool flange, reading and storing the positions of the actuators for each measuring point, carry out a re-orientation of one or more axis of the wrist, moving the robot such that the measuring tip is in contact with a plurality of measuring points on the tool flange for the new orientation of the wrist, reading and storing the positions of the actuators for each measuring point, and estimating a plurality of kinematic parameters for the wrist based on a geometrical model of the movable platform, a geometrical model of the tool flange, the kinematic model of the robot, the stored positions of the actuators for the measuring points, and the estimated kinematic parameters for the main axes of the robot. This embodiment makes it possible to estimate the kinematic parameters for the wrist, which include orientation and position of the actuator and rotation axes of the wrist. If the geometry of the wrist flange and/or of the movable platform is not complex enough for the identification, special purpose calibration objects with known CAD-models can be mounted on the wrist flange/movable platform during calibration.

According to a further aspect of the invention, the object is achieved by a computer program product directly loadable into the internal memory of a computer or a processor, comprising software code portions for performing some of the steps of the method, when the program is run on a computer. The computer program receives and stores the measurements and performs the calculations necessary in order to estimate the kinematic parameters.

According to another aspect of the invention, the object is achieved by a computer readable medium having a program recorded thereon, when the program is to make a computer perform at least some the steps of the method, and the program is run on the computer.

According to another aspect of the invention this object is achieved by a system. Such a system comprises a measuring tip mounted on or in the vicinity of the robot, at least one geometrical structure on or in the vicinity of the robot, storage means for storing the positions of the actuators for a plurality of measuring points when the measuring tip is in contact with the surface of the geometrical structure, and a calibration module adapted to estimate a plurality of kinematic parameters for the robot based on a geometrical model of the geometrical structure, a kinematic model of the robot, and the stored positions of the actuators. The measuring tip can be any type of measuring tip, for example a rigid stylus.

BRIEF DESCRIPTION OF THE DRAWINGS

The invention will now be explained more closely by the description of different embodiments of the invention and with reference to the appended figures.

FIGS. 1a-d show examples of robot components.

FIG. 2 shows an example of an assembled robot.

DETAILED DESCRIPTION OF PREFERRED EMBODIMENTS OF THE INVENTION

Figure 3A:
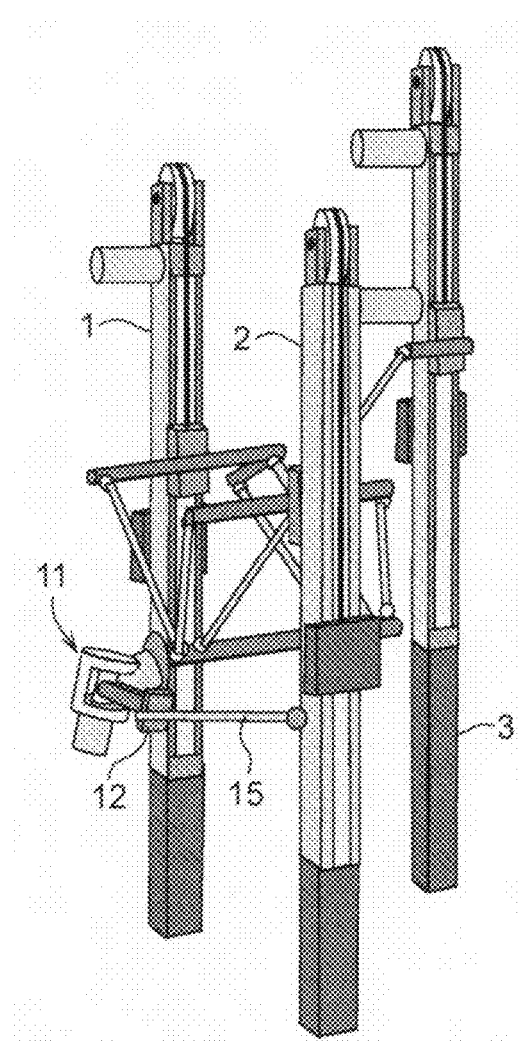
FIGS. 3a-b show measurements on the robot structure by a measuring tip mounted on the robot.

In the following, examples of the method and system according to the invention will be described in connection with a parallel kinematic manipulator. However, the invention is applicable also for other types of manipulators such as serial kinematic manipulators.

A parallel kinematic manipulator (PKM) is defined as a manipulator comprising at least one stationary element, a movable element, denoted a platform, and at least two arms. Each arm comprises a link arrangement connected to the movable platform. Each arm is actuated by a driving means preferably arranged on the stationary element to reduce the moving mass. These link arrangements transfer forces to the movable platform. For a fully built-up parallel kinematic manipulator for movement of the platform with three degrees of freedom, e.g. in directions x, y and z in a Cartesian system of coordinates, three parallel-working arms are required.

FIGS. 1a-c show examples of robot components which can be delivered directly from the component manufacturer to the end customer. FIG. 1a shows three linear tracks 1-3, which define linear axes for the robot. On each track 1-3 there is a carriage 4, which is actuated to move along the track by a linear actuator, including a motor 5, a ball screw module 6, a wire 7, and a wheel 8 for the wire. The wires are attached to a weight with the purpose of compensating for gravity to reduce the actuator power needed. FIG. 1b shows links 10 of the robot, FIG. 1d shows a wrist 11, having a tool flange 12, in the following de-noted a wrist flange, and FIG. 1c shows joint mounting structures mounted on the carriages. One of the mounting structures is provided with a platform 13.

FIG. 2 shows the manipulator when it has been assembled. Each carriage 4 is connected to the platform 13 by means of an arm. Each arm comprises one or more parallel links 10. At each end of the links there is a joint. The manipulator shown in FIG. 2 has three arms each movable about a linear axis. Thus, the manipulator has three linear main axes, which are defined by the three linear tracks 1-3. To be able to determine the position of the manipulator, each linear track is provided with a position measuring device, which is adapted to measure the position of the carriage relative to the linear track. Usually this measurement is made by the measurement of the shaft angle of the motor driving a ball screw or a rack and pinion carriage. The wrist 11 is mounted on the platform 13. The wrist is movable about a plurality of rotational wrist axes. The number of wrist axes can be one, two, or three. The manipulator shown in FIG. 3a has two wrist axes. The wrist is provided with an angle measuring devices, for example in the form of encoders or resolvers indicating the angular positions of the wrist axis. The robot also comprises a control unit 14 including processing means 14a, such as a CPU, and memory means 14b, for storing data, robot programs and other software modules. The control unit is adapted to receive measurements from the measuring devices.

When the manipulator has been assembled, the first task is to calibrate the structure. In the following, a calibration method according to an embodiment of the invention will be described. The first step of the method is to measure a plurality of measuring points on the surface of a geometrical structure on or in the vicinity of the robot. The geometrical structure must have a known geometrical model, for example a CAD-model. In this embodiment the geometrical structure is the linear tracks 1-3 of the manipulator. The CAD-models for the linear tracks are already known from the production stage of the tracks. The CAD models may comprise triangles approximating the surfaces of the objects, or a more accurate description of the surfaces using surface splines. Splines are a number of polynomials that describe small parts of a surface and these polynomials are fused together to obtain a continuity when describing the whole surface.

Figure 3B:
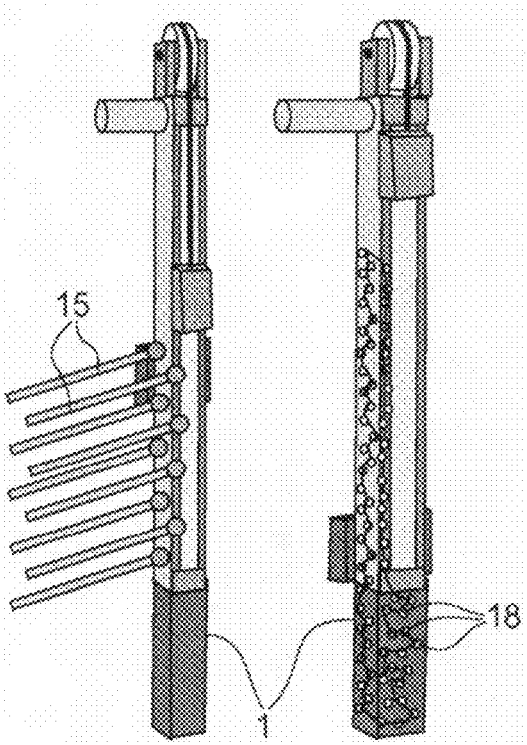

A measuring tip 15, for example a rigid stylus, is mounted on the wrist flange 12 of the wrist, as shown in FIG. 3a. The measuring tip 15 is moved over the surfaces of the three linear tracks 1-3 to collect the geometrical information necessary to identify some of kinematic parameters of the manipulator. FIG. 3b shows how the measuring tip 15 is moved over two surfaces of one of the linear tracks 1. FIG. 3b also shows the measuring points 18. For each measuring point, the positions of the actuators are read and stored by means of the angle measuring devices. The figure just shows examples of linear track geometries that are used. For a complete manipulator calibration more geometrical features may be needed. The most important kinematic parameters to be identified are the positions and orientations of the actuator paths since these will depend on the installation. The lengths of the links could be measured or controlled during manufacturing and could be provided by the component manufacturer.

In a next step, the kinematic parameters of the manipulator are estimated based on the stored measurements. The calculated measurement points on the surfaces of the linear geometrical structure (calculated by means of the kinematic model with estimated parameters) are used to make best fit to the geometrical model of the geometrical structure. In the best fit process adaption of the kinematic parameters of the manipulator are optimized. Estimation of the kinematic parameters includes calculating the positions of the measuring tip based on the stored positions of the actuators and a kinematic model of the robot. The identification of kinematic parameters for manipulators are well known. Thus, the identification of a kinematic model for a parallel kinematic manipulator is for example described in a document from proceedings of the 2003 IEEE International Conference on Robotics & Automation, Taiwan Sep. 14-19, 2003, "Vision-based kinematic calibration of a H4 parallel mechanism" by Pierre Renoud, Nicolas Andreff, Fredric Marquet and Philippe Martinet. An overview of methods for the identification of kinematic robot parameters for serial kinematic manipulators is for example described in the document "A comparison of identification techniques for robot calibration" by Robert John Horning, Department of Electrical Engineering Case Westen Reserve University, Aug., 1998, Chapter 2, pages 5-7.

The forward kinematic model $K_{fwd}$ is a function of m unknown kinematic parameters a1, a2, . . . am, such as actuator positions and orientations, link lengths and link mounting positions on the actuator carriages and on the manipulated platform:

$$K_{fwd}(a1, a2, \ldots am, q1, q2, \ldots, q5)$$

where q1, q2, q3 are the actuator positions for the linear tracks, and q4, q5 are the angle positions for the wrist.

Let $(X_i, Y_i, Z_i)$ be positions on the surfaces of the reference objects expressed in a robot coordinate system. Then the following equations can be set up for the measuring points on the reference object surfaces touched by the measuring tip while registration is made of the actuator positions:

$$(X_1, Y_1, Z_1) = K_{fwd}(a1, a2, \ldots am, q_{11}, q_{21}, \ldots, q_{51})$$

$$(X_2, Y_2, Z_2) = K_{fwd}(a1, a2, \ldots am, q_{12}, q_{22}, \ldots, q_{52})$$

$$(X_n, Y_n, Z_n) = K_{fwd}(a1, a2, \ldots am, q_{1n}, q_{2n}, \ldots, q_{5n})$$

where n is the number of registrations on the surfaces, m is the number of kinematics parameters to be identified, and qij is the position registration on actuator i at measuring tip position j on the reference object surfaces.

The mathematical description of Kfwd is known and the next step is to find its parameters a1, a2, . . . am. With the known CAD model (for example with surface spline descriptions of the surfaces of the reference object) a best fit is made of the kinematics parameters a1, a2 . . . am to generate positions $X_i, Y_i, Z_i$ that are all on the theoretical reference object surface with the minimum deviation distribution, for example in a least square sense. For this best fit several surfaces and reference objects could be used to make it possible to identify all the kinematics parameters. For the best fit optimisation, methods as lsqnonlin in Mat-Lab can be used and the procedure may consist of iterative adjustments of the kinematics parameters until matches are obtained between all CAD model surfaces and positions obtained from the identified kinematics parameters.

Figure 4:
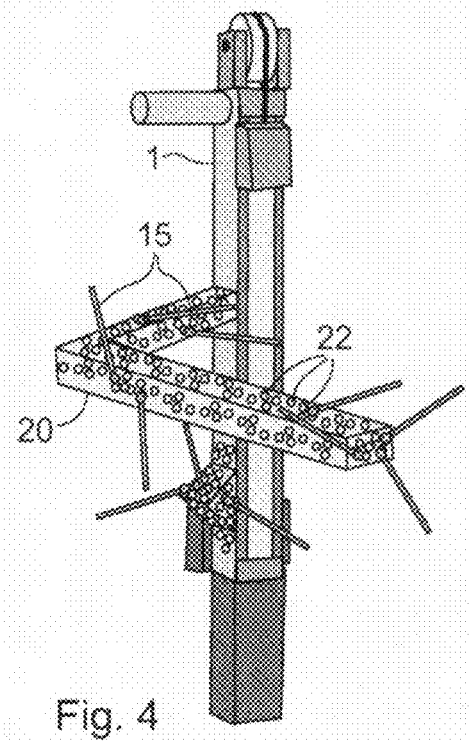
FIG. 4 shows measurements on a geometrical structure mounted on the robot.

To obtain all the kinematic parameters of the manipulator, enough geometrical features must be available. If the geometry of the linear tracks does not contain the features needed, one or more special calibration objects can be mounted on the linear tracks or elsewhere during the calibration. The calibration object works as a geometrical structure for the calibration. FIG. 4 shows a calibration object 20 mounted on the linear track 1 in order to improve the measurements. The measuring tip 15 is then moved over the surfaces as shown in FIG. 4 with different orientation on the measuring tip 15. To make this simple the main axes could be force manipulated while the wrist axes are controlled to have a fixed orientation of the measuring tip for each surface measurement 22. With a correct manipulator kinematic model the best fit of the model geometry to the real geometry will give the same position, orientation and shape of the model surface as for the measured surface. However, with kinematic errors the position, orientation and shape will not be possible to match to the model and according to the method the kinematic model is then changed until best fit is obtained.

The estimation of the kinematic parameters, including the best fit calculations, is performed by a calibration module including software instruction for carrying out the necessary calculations. Preferably, this software module is stored in the memory means 14b of the robot control unit 14 and the software instructions are executed by the processing means 14a of the control unit. However, it is also possible to store and execute the calibration module on an external computer connected to the robot control unit.

Figure 5:
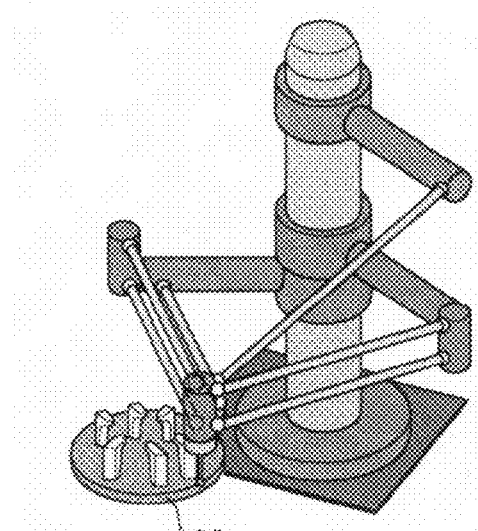
FIG. 5 shows measurements on with a measuring tip mounted on the robot a geometrical structure located in the workspace of the robot.

In FIG. 5, a geometrical structure 23 having four spheres with known radius and position relative each other are used for the calibration. The geometrical structure is placed at different places in the robot workspace to be able to identify all the kinematic parameters. The measurements on the object are made by moving the measuring tip over the surfaces with force manipulation of the robot. In the figure a robot with three degrees of freedom is used.

Figure 6A:
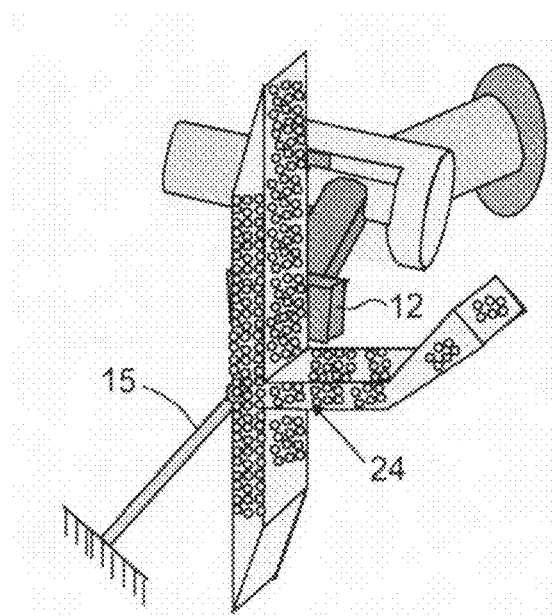
FIGS. 6a-b show measurements with a measuring tip fixedly mounted in the robot workspace on a geometrical structure mounted on the robot.
Figure 6B:
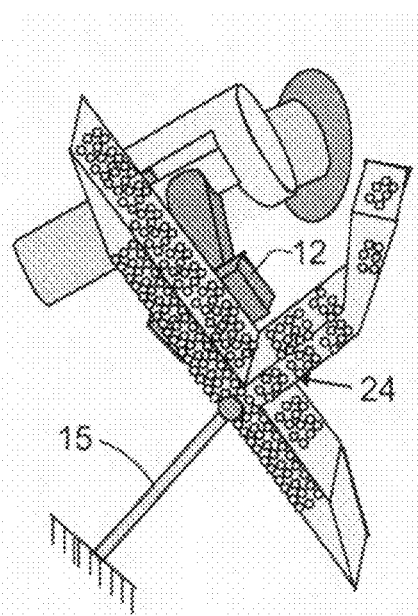

Instead of mounting the measuring tip 15 on the wrist flange 12, it can be mounted fixed to the linear track, or on some other object in the vicinity of the manipulator, as shown in FIG. 6a-b.

Then a geometrical structure in the form of a calibration object 24 is mounted on the wrist flange 12 and the calibration object is moved around to measure surface points on its surface. For each surface measurement, the main axes should be force manipulated while the wrist is controlled to have a fixed orientation. Best fit of calibration geometry and manipulator kinematics is made at different wrist orientations to get a redundant equation system. To avoid the need of too large a calibration object mounted on the wrist, more than one measurement tips could be mounted in the workspace of the manipulator. In that case, it could also be possible to use the wrist flange 12 itself as the geometrical structure. It should be noted that the measurements are made during movements of the surfaces over the measuring tips since the reference object is on the robot, which will also be very fast.

Figure 7:
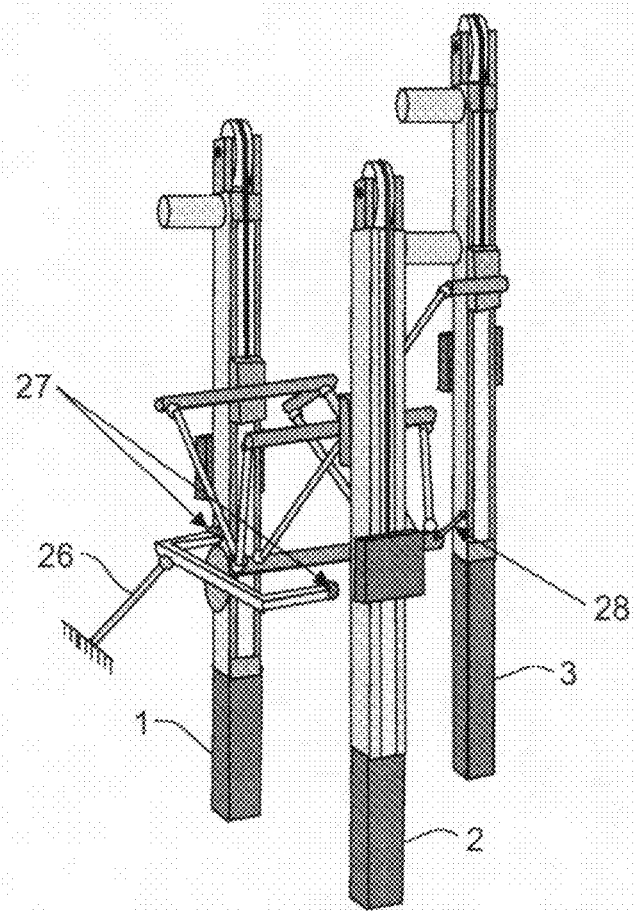
FIG. 7 shows measurements suitable for main axis calibration.

Since the main axes alone do not give the same mobility for a measuring tip, as when the wrist is mounted on the manipulator, three measuring tip arrangements are needed to reach all three linear tracks 1-3, as shown in FIG. 7. A first arrangement, including one measuring tip 26, is mounted fixed in space and is used for carrying out measurements on geometries on the actuated platform. A second arrangement 27 including two measuring tips for measurements on the front linear tracks is mounted on the platform. A third arrangement 28, including one measuring tip, for measuring on the rear linear track, is mounted on the carriage of one of the front linear tracks. If calibration objects are placed inside the workspace, one measuring tip could be enough, especially if calibration with a fixed measuring tip also is made. Fixed measuring tip and big calibration geometry on the actuated platform could be very efficient. As for the case with a whole robot calibration, the kinematic parameters of the manipulator are calculated by best fit of geometry models to the measured geometries. Since no wrist is in the kinematics, fewer parameters need to be calculated in this case.

Figures 8A, 8B:
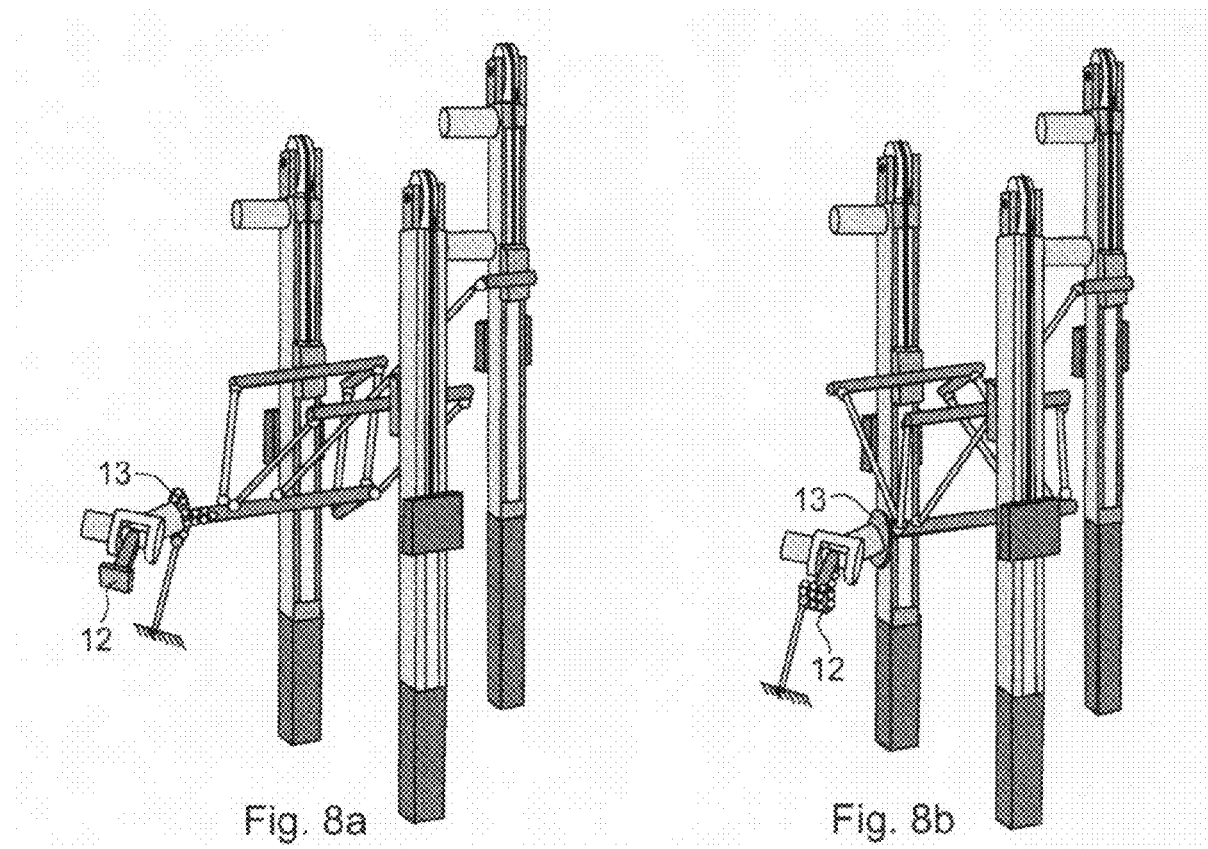
FIGS. 8a-b shows measurements suitable for wrist calibration.

If the main axes have been calibrated separately, and the wrist is then mounted on the actuated platform, the wrist could be calibrated relative to the actuated platform, as shown in FIGS. 8a-b. First, geometries are measured on the manipulated platform 13, FIG. 8a, and then a geometry on the wrist flange 12 is measured, FIG. 8b. The geometry on the wrist flange is measured at different wrist orientations (compare FIG. 6a-b) to identify the wrist kinematics.

Figure 9:
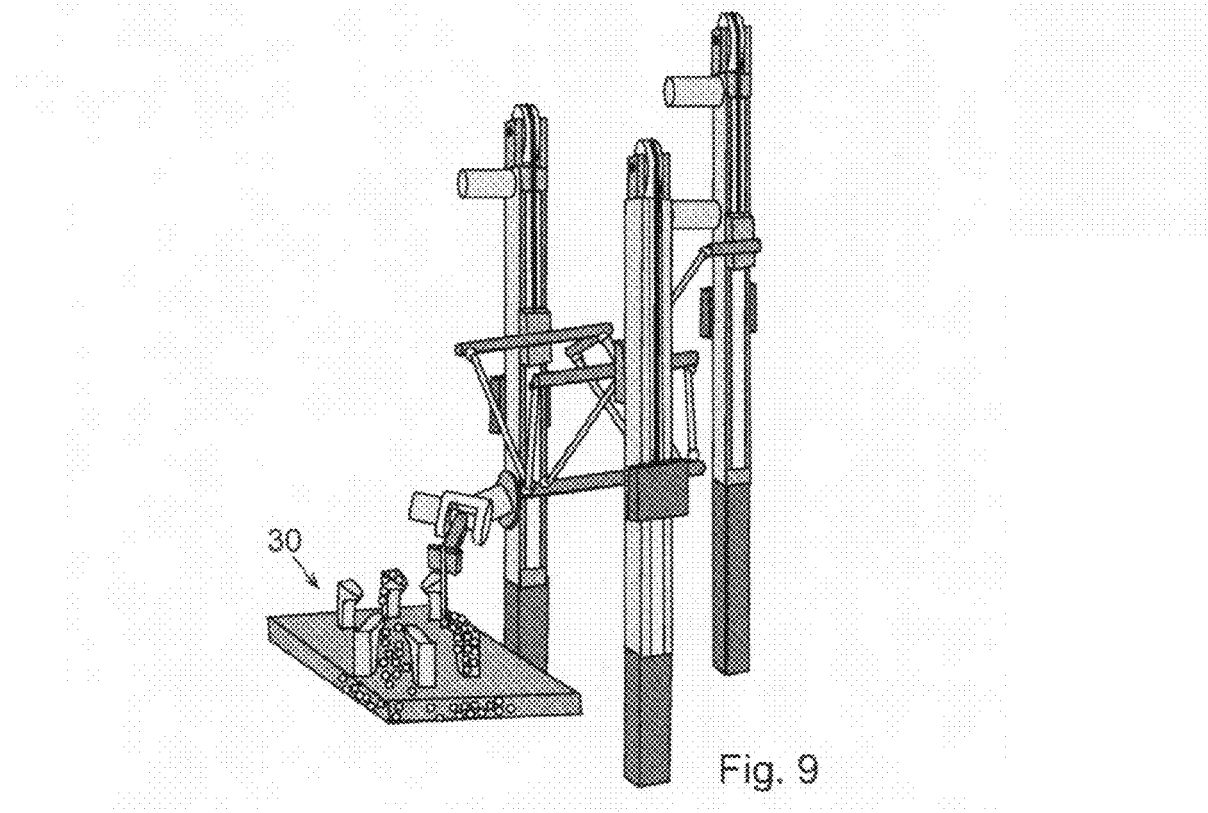
FIG. 9 shows measurements suitable for fixture calibration.

FIG. 9 shows an example of calibration on a fixture 30. A measuring tip is mounted on the wrist flange or on the tool and the operator moves the measuring tip over surfaces of the fixture. If a geometrical model already exists of the fixture, this model is used to make best fit and calculate the position and orientation of the fixture. If no model exists, as many surfaces as possible on the fixture are measured and a geometrical fixture model is built up (for example with spline surfaces). When later a fixture exchange is made and after that the measured fixture is inserted again, the manipulator can measure the same points again and calculate the new position and orientation of the fixture. In this way it will not be necessary to have an accurate fixture mounting. Every time the fixture is mounted, some of its surfaces will be measured, either manually or by a program, generated the first time when the measurement movements were made.

Figure 10A:
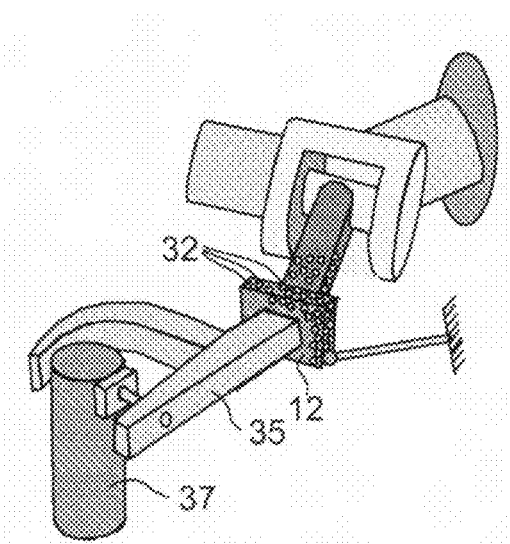
FIGS. 10a-b show measurements suitable for gripper calibration.
Figure 10B:
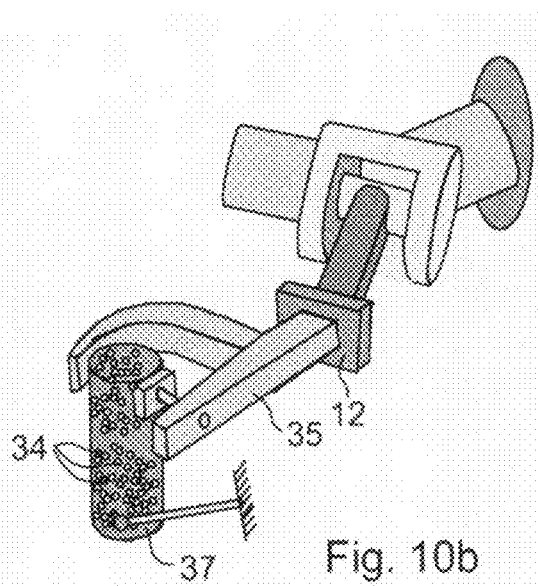

FIGS. 10a-b show measurements 32,34 suitable for gripper calibration. A gripper 35 on the wrist flange 12 can be calibrated in the same way as the wrist. However, FIGS. 10a-b show an indirect measurement, where the gripper holds a calibration object 37 on which surfaces are measured. First, the wrist flange geometry is measured and then the geometry of the calibration object 37. FIG. 10a shows measurements 32 on the wrist flange 12 and FIG. 10b shows measurements 42 on the calibration object 37. When the manipulator is programmed to grip the object, the necessary wrist flange position and orientation, that the manipulator must obtain, can then be calculated.

Figure 11A:
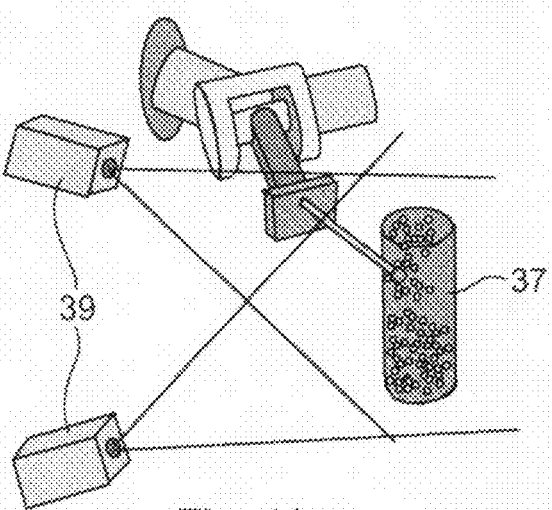
FIGS. 11a-b show vision system calibration.
Figure 11B:
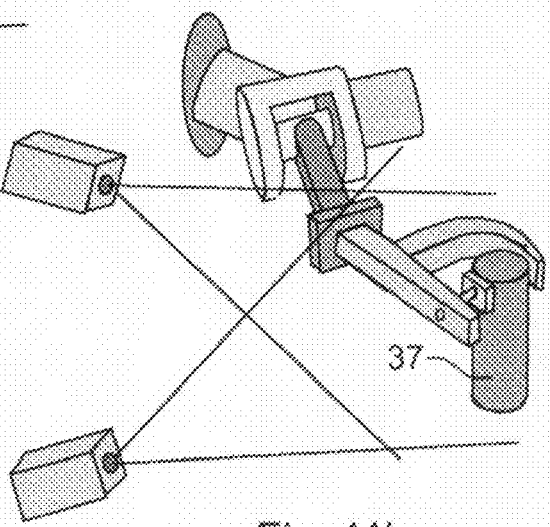

FIGS. 11a-b show vision system calibration. The best fit concept can also be used for the calibration of a vision system without working with a vision programming tool. The calibration object 37 is placed in the range for a vision system 39 and the robot is used to measure surfaces on the calibration object. These surfaces are then correlated to the object information given by the vision system (in the figure a stereo vision system) and the vision system will be able to measure the position and orientation of the object in the robot coordinate system without any calibration or teach in of the vision system. When the robot is then going to grip a similar object like in the figure to the right, the vision system will calculate the position and orientation of the object and based on the gripper calibration in FIG. 10a-b it will be possible for the robot to grip the object with the information coming from the vision system. Of course, the same principle could be used to calibrate and program a vision system mounted on the robot arm. However, then it could be simplest to measure the surfaces of the calibration object when it is gripped, as shown in FIG. 11b, by moving the surfaces against a measuring tip fixed in the cell.

Figure 12:
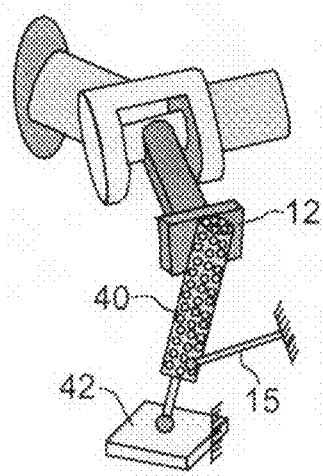
FIGS. 12 and 13a-b show calibration of discrete sensors.
Figure 13A:
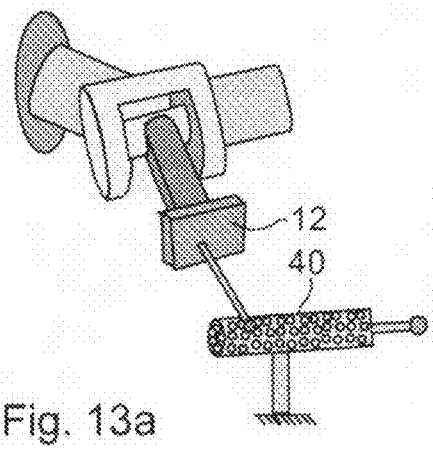
Figure 13B:
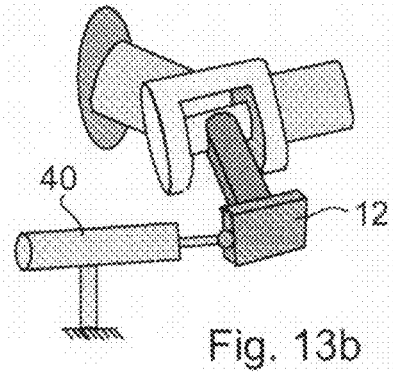

FIGS. 12 and 13a-b show calibration of discrete sensors. The calibration using geometrical features is the same for a sensor 40 (exemplified with an LVDT in the figure) as for a tool. What will be added is a measurement of the measurement range. FIG. 12 shows the case when the sensor 40 is mounted on the wrist flange 12. Then the geometrical calibration is made by means of a measuring tip 15 fixed to the environment and the measurement range is calibrated with a plate 42 which has earlier been calibrated as any object (compare FIG. 9) fixed to the environment. When the sensor is fixed to the environment, the geometry is calibrated as shown in FIGS. 13a-b and the measurement range is calibrated using the already calibrated wrist flange geometry.

Figure 14A:
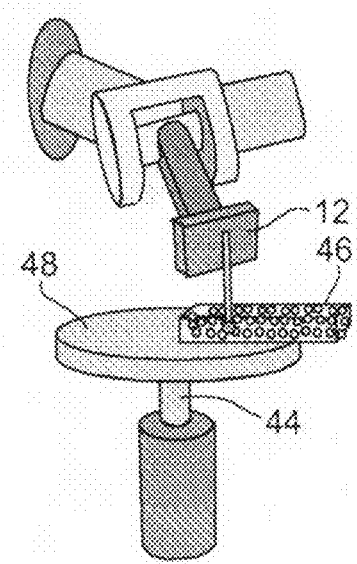
FIGS. 14a-b show calibration of a rotating axis.
Figure 14B:
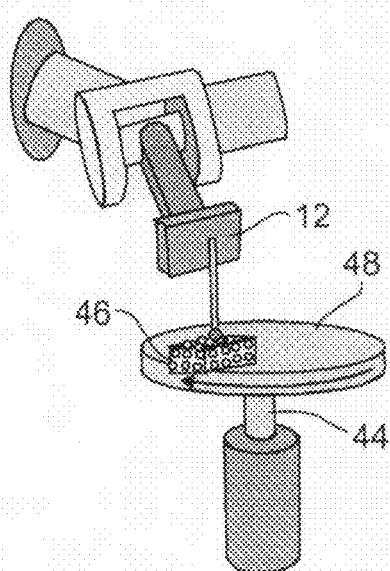

FIGS. 14a-b show calibration of an optional manipulator including a rotating optional axis 44 and a rotating table 48. Calibration of the rotating optional axis 44 fixed in the cell can be made by mounting a calibration object 46 on the rotating table 48 and then measure object surfaces at two different angles of the table, as shown in the figures. If there are enough geometrical features on the table itself, the calibration could be made using the table geometry. Another possibility is to use the geometrical features of a fixture mounted on the table (compare FIG. 9). If the optional manipulator has two axes both axes must be rotated giving at least four poses for the calibration object and thus four complete measurements of the surfaces. If the optional axis is mounted on the robot flange it will be possible to use the same method as used for the wrist calibration.

Figure 15A:
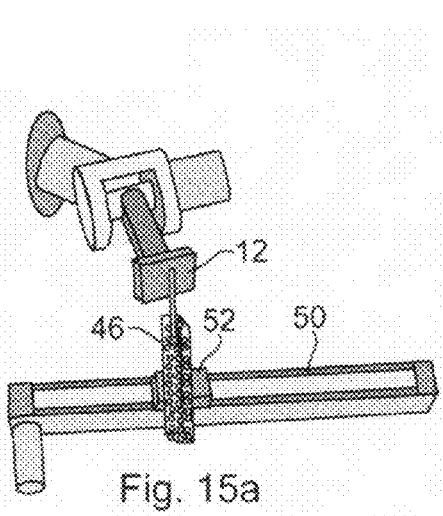
FIGS. 15a-b and 16 show calibration of a linear axis.
Figure 15B:
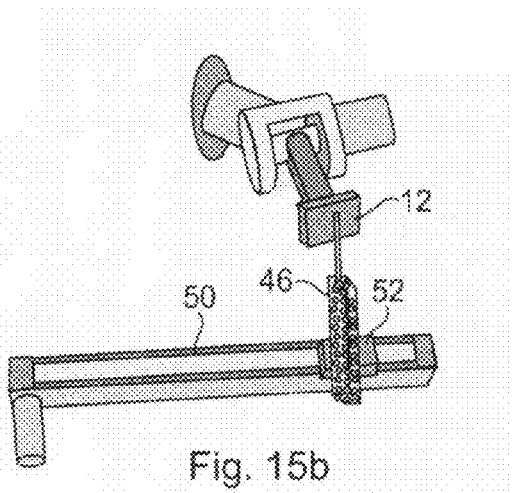

FIGS. 15a-b show calibration of an optional manipulator including a linear optional axis 50 and a moving table 52. Calibration of the linear optional axis 50, fixed in the robot cell, can also be made by mounting a calibration object 46 on the moving table and then measuring object surfaces at two different positions of the table. If there are enough geometrical features on the table itself the calibration could be made using the table geometry. Another possibility is to use the geometrical features of a fixture mounted on the table (compare FIG. 9). If the optional manipulator has two axes, both axes must be moved giving at least four poses for the calibration object and thus four complete measurements of the surfaces. The same calibration method can be used for the calibration of a conveyor.

Figure 16:
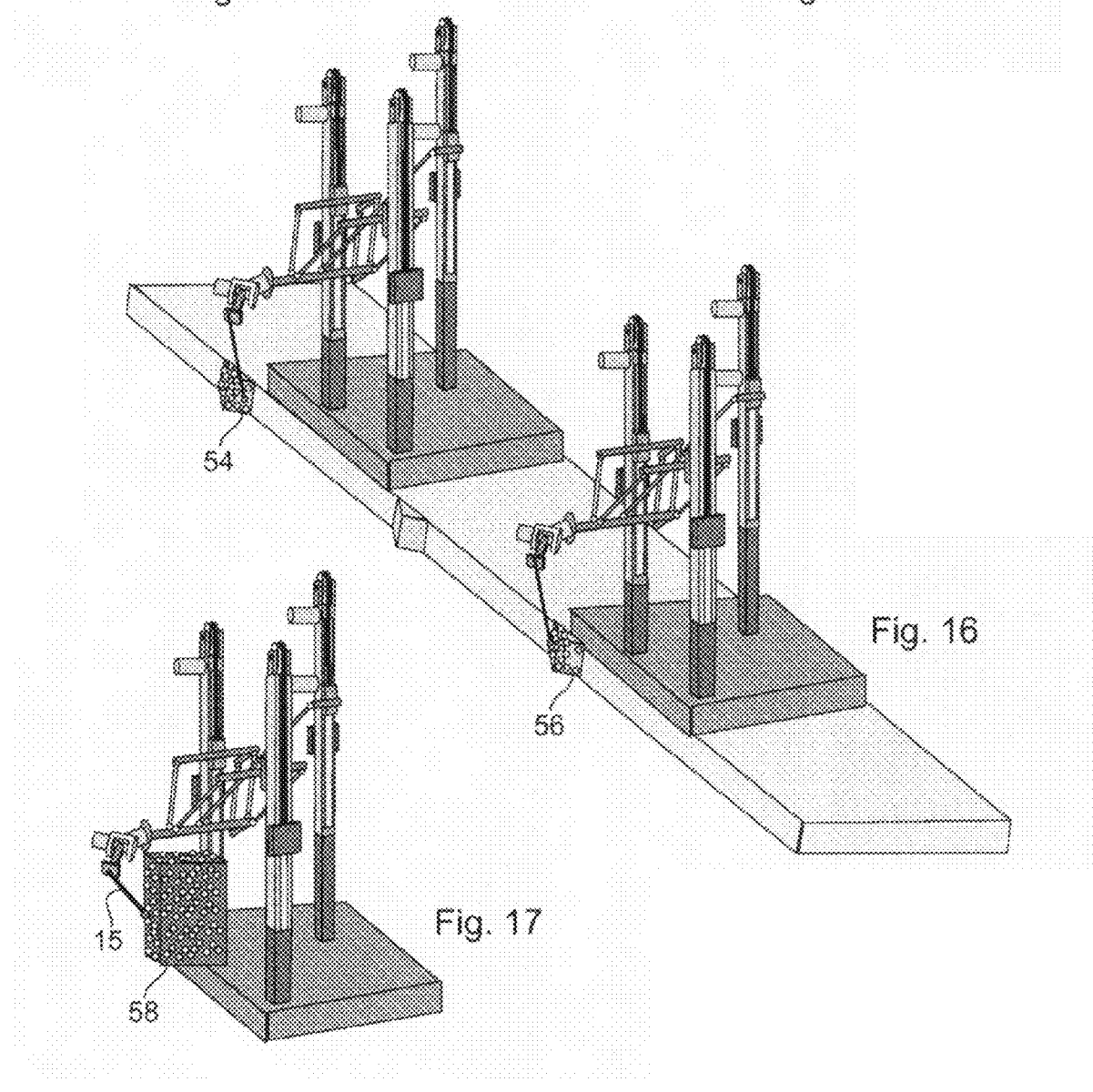

Calibration of a linear optional axis (track) fixed in the cell and carrying the manipulator can be made by mounting calibration objects 54,56 on the fixed part of the track and measuring the object surfaces at least at two different positions of the manipulator, as shown in FIG. 16.

Figure 17:
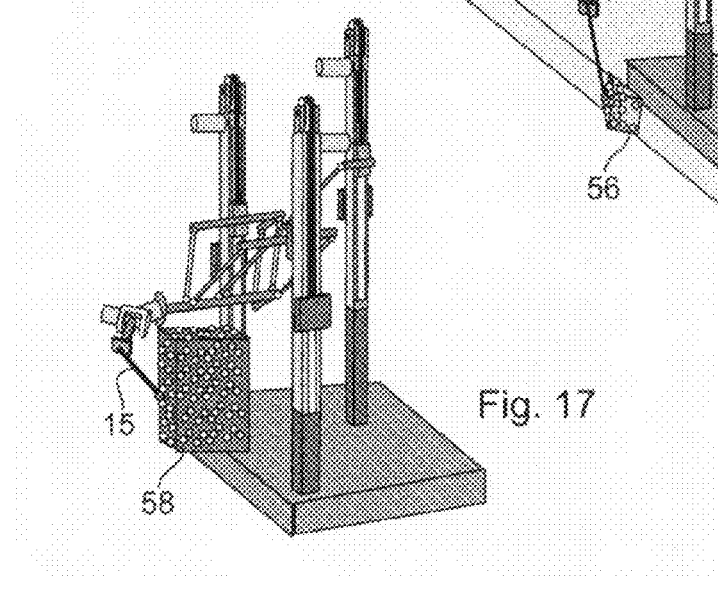
FIG. 17 shows definition of forbidden zones.

FIG. 17 shows a definition of forbidden zones. Obstacles 58 in the workspace can simply be defined by moving a measuring tip 15 over the surfaces of the obstacle. This system will then calculate the forbidden zone for the robot and use it during the execution of robot programs. The measurements are the same as for any object in the workspace and can also be used to calibrate, for example, fixed tables used for loading/unloading operations.

The invention claimed is:

1. A method for calibration of an industrial robot including a plurality of movable links and a plurality of actuators effecting movement of the links and thereby of the robot, the method comprising:
   mounting a measuring tip on or in the vicinity of the robot,
   providing at least one geometrical structure comprising a part of the robot or a calibration object mounted on or in the vicinity of the robot,
   moving the robot by the operator such that the measuring tip is in contact with a plurality of measuring points on a surface of the at least one geometrical structure,
   reading and storing with the robot positions of the actuators for each of the plurality of measuring points on the surface of the at least one geometrical structure, and
   estimating a plurality of kinematic parameters for the robot based on a geometrical model of the geometrical structure, a kinematic model of the robot, and the stored positions of the actuators for the measuring points.

2. The method according to claim 1, wherein said estimation of the kinematic parameters comprises:
   calculating the positions of the measuring tip based on the stored positions of the actuators and the kinematic model of the robot, and
   using a best fit method in order to find the kinematic parameters that achieves the best correspondence between the calculated positions of the measuring tip and corresponding positions on the geometrical model of the geometrical structure.

3. The method according to claim 1, wherein said geometrical structure is a part of the robot.

4. The method according to claim 3, wherein at least one of said actuators is mounted in an actuator support structure, and said geometrical structure is said actuator support structure and said geometrical model is a CAD-model of the actuator support structure.

5. The method according to claim 1, wherein the robot comprises a wrist having a tool flange and the measuring tip is mounted on the tool flange of the wrist.

6. The method according to claim 1, wherein said kinematic parameters include position and orientation of the actuators.

7. The method according to claim 1, further comprising:
notifying the operator if it is not possible to determine all kinematic parameters based on the stored positions.

8. The method according to claim 1, further comprising:
mounting a second geometrical structure on or in the vicinity of the robot,
moving the robot by the operator such that the measuring tip is in contact with a plurality of measuring points on a surface of the second geometrical structure,
reading and storing the positions of the actuators for each measuring point on a surface of the second geometrical structure, and
estimating at least some of the kinematic parameters based on a geometrical model of the second geometrical structure, the kinematic model of the robot, and the stored positions of the actuators for the measuring points on the second geometrical structure.

9. The method according to claim 8, wherein at least one of said actuators is mounted in an actuator support structure, and said second geometrical structure is mounted on the actuator support structure.

10. The method according to claim 1, wherein the robot comprises a plurality of main axes and said estimated parameters are kinematic parameters for the main axes of the robot.

11. The method according to claim 10, wherein said links control a movable platform, said geometrical structure is the movable platform, the method further comprising:
moving the robot such that the measuring tip is in contact with a plurality of measuring points on the platform,
reading and storing the positions of the actuators for each measuring point,
mounting a wrist having a tool flange to the movable platform,
moving the robot such that the measuring tip is in contact with a plurality of measuring points on the tool flange,
reading and storing the positions of the actuators for each measuring point,
carry out a reorientation of one or more axis of the wrist,
moving the robot such that the measuring tip is in contact with a plurality of measuring points on the tool flange for the new orientation of the wrist,
reading and storing the positions of the actuators for each measuring point, and
estimating a plurality of kinematic parameters for the wrist based on a geometrical model of the platform, a geometrical model of the tool flange, the kinematic model of the robot, the stored positions of the actuators for the measuring points, and the estimated kinematic parameters for the main axis of the robot.

12. The method according to claim 1, wherein the geometrical structure is mounted on the robot and is moved by the links of the robot.

13. A computer program product, comprising:
a non-transitory computer readable medium; and
computer program instructions recorded on the non-transitory computer readable medium and executable by a processor for performing calibration of an industrial robot including a plurality of movable links, a plurality of actuators effecting movement of the links, the calibration comprising:
receiving and storing positions of the actuators corresponding to a plurality of measuring points on a surface of at least one geometrical structure comprising a part of the robot or a calibration object mounted on or in the vicinity of the robot, for which a measuring tip, mounted on or in the vicinity of the robot, is in contact with the surface,
reading and storing with the robot positions of the actuators for each of the plurality of measuring points on the surface of the at least one geometrical structure,
estimating a plurality of kinematic parameters for the robot based on a geometrical model of the geometrical structure, a kinematic model of the robot, and the stored positions of the actuators for the measuring points.

14. A system for calibration of an industrial robot including a movable platform, a plurality of movable links controlling the movable platform, and a plurality of actuators effecting movement of the links and thereby of the robot, the system comprising:
a measuring tip mounted on or in the vicinity of the robot,
at least one geometrical structure comprising a part of the robot or a calibration object mounted on or in the vicinity of the robot,
storage configured to read and store positions of the actuators for a plurality of measuring points when the measuring tip is in contact with a plurality of points on a surface of the at least one geometrical structure, and
a calibration module adapted to estimate a plurality of kinematic parameters for the robot based on a geometrical model of the geometrical structure, a kinematic model of the robot, and the stored positions of the actuators.

15. The system according to claim 14, wherein said calibration module is adapted to calculate the positions of the measuring tip based on the stored positions of the actuators and the kinematic model of the robot, and to use a best fit method in order to find the kinematic parameters that achieves the best correspondence between the calculated positions of the measuring tip and corresponding positions on the geometrical model of the geometrical structure.

16. The system according to claim 14, wherein said at least one geometrical structure is mounted on the robot such that the geometrical structure is moved by the links of the robot.

17. The system according to claim 16, wherein at least one of said actuators is mounted in an actuator support structure, and said geometrical structure is said actuator support structure and said geometrical model is a CAD-model of the actuator support structure.

18. The system according to claim 14, wherein the robot comprises a wrist having a tool flange and the measuring tip is mounted on the tool flange of the wrist.

19. The system according to claim 14, wherein said kinematic parameters include position and orientation of the actuators.

20. The system according to claim 14, further comprising:
a second geometrical structure mounted on or in the vicinity of the robot, wherein said calibration module is adapted to determine further kinematic parameters for the robot based on a geometrical model of the second geometrical structure, the kinematic model of the robot, and positions of the actuators for the measuring points on the second geometrical structure.

21. A method for calibration of an industrial robot including a movable platform, a plurality of movable links controlling the movable platform, and a plurality of actuators effecting movement of the links and thereby of the robot, the method comprising:
mounting a measuring tip on or in the vicinity of the robot;
mounting to the movable platform a wrist movable in one or more degrees of freedom and having a tool flange;
mounting a geometrical structure on the tool flange;

moving the robot such that the measuring tip is in contact with a plurality of measuring points on a surface of the at least one geometrical structure;

reading and storing positions of the actuators for each measuring point on the surface of the at least one geometrical structure;

reorienting at least one axis of the wrist;

moving the robot such that the measuring tip is in contact with a plurality of measuring points on the at least one geometrical structure with the at least one reoriented axis of the wrist;

reading and storing positions of the actuators for each measuring point on the at least one geometrical structure;

estimating a plurality of kinematic parameters for the robot based on a geometrical model of the at least one geometrical structure, a kinematic model of the robot, and the stored positions of the actuators for the measuring points.

22. A system for calibration of an industrial robot including a movable platform, a plurality of movable links controlling the movable platform, and a plurality of actuators effecting movement of the links and thereby of the robot, the system comprising:

a measuring tip mounted on or in the vicinity of the robot;

a wrist movable in at least one degree of freedom mounted to movable platform and having a tool flange;

at least one geometrical structure on the tool flange;

storage configured to read and store positions of the actuators for a plurality of measuring points when the measuring tip is in contact with a surface of the at least one geometrical structure; and a calibration module adapted to estimate a plurality of kinematic parameters for the robot based on a geometrical model of the geometrical structure, a kinematic model of the robot, and the stored positions of the actuators.

* * * * *